US 10,119,488 B2

(12) United States Patent
Roos et al.

(10) Patent No.: US 10,119,488 B2
(45) Date of Patent: Nov. 6, 2018

(54) CONTROL OF AN INTERNAL COMBUSTION ENGINE IN A VEHICLE

(71) Applicant: Scania CV AB, Södertälje (SE)

(72) Inventors: Fredrik Roos, Segeltorp (SE); Mikael Ögren, Norsborg (SE); Olof Larsson, Stockholm (SE)

(73) Assignee: SCANIA CV AB, Södertälje (SE)

(*) Notice: Subject to any disclaimer, the term of this patent is extended or adjusted under 35 U.S.C. 154(b) by 97 days.

(21) Appl. No.: 15/320,968

(22) PCT Filed: Jun. 16, 2015

(86) PCT No.: PCT/SE2015/050701
§ 371 (c)(1),
(2) Date: Dec. 21, 2016

(87) PCT Pub. No.: WO2016/007073
PCT Pub. Date: Jan. 14, 2016

(65) Prior Publication Data
US 2017/0198655 A1      Jul. 13, 2017

(30) Foreign Application Priority Data

Jul. 7, 2014 (SE) ..................... 1450872

(51) Int. Cl.
*B60W 50/00*       (2006.01)
*B60W 10/18*       (2012.01)
(Continued)

(52) U.S. Cl.
CPC .......... *F02D 41/065* (2013.01); *B60W 10/06* (2013.01); *B60W 10/18* (2013.01);
(Continued)

(58) Field of Classification Search
CPC .......... F02D 41/06; F02D 41/12; F02D 41/26; F02D 41/065; B60W 50/0097; B60W 10/06; B60W 30/143
See application file for complete search history.

(56) References Cited

U.S. PATENT DOCUMENTS 9,821,803 B2 * 11/2017 Johansson ......... B60W 50/0097
2007/0005218 A1 *  1/2007 Ueyama ............... B60W 30/16
                                                      701/96
(Continued)

FOREIGN PATENT DOCUMENTS

DE     102009045567 A1    4/2011
EP         2540589 A2     1/2013
(Continued)

OTHER PUBLICATIONS

International Search Report of the International Searching Authority for PCT/SE2015/050701 dated Oct. 30, 2015.
(Continued)

*Primary Examiner* — Hieu T Vo
*Assistant Examiner* — Arnold Castro
(74) *Attorney, Agent, or Firm* — Moore & Van Allen PLLC; W. Kevin Ransom (57) ABSTRACT

Methods and systems are provided for control of a combustion engine in a vehicle. In operation, at least one future speed profile for an actual speed of the vehicle is simulated during a road section ahead based on information about the road section and on knowledge that coasting with the combustion engine shut down will be applied during the road section. Subsequently, based on the future speed profile, a starting point in time is determined, when the combustion engine will need to be started for forward driving the vehicle and/or to brake the vehicle. Subsequently, a starting point brought forward in time is determined based on the need for a forward driving or braking force arising, where
(Continued)

the starting point brought forward in time precedes the starting point in time. Subsequently, the combustion engine is controlled to be started at the starting point brought forward in time.

20 Claims, 5 Drawing Sheets (51) Int. Cl.
| | |
|---|---|
| B60W 30/18 | (2012.01) |
| F02D 41/06 | (2006.01) |
| B60W 10/06 | (2006.01) |
| B60W 10/196 | (2012.01) |
| B60W 30/14 | (2006.01) |
| F02D 41/12 | (2006.01) |
| F02D 41/26 | (2006.01) |
| B60W 30/184 | (2012.01) |
| F02D 41/14 | (2006.01) |

(52) U.S. Cl.
CPC ........ *B60W 10/196* (2013.01); *B60W 30/143* (2013.01); *B60W 30/18072* (2013.01); *B60W 50/0097* (2013.01); *F02D 41/06* (2013.01); *F02D 41/12* (2013.01); *F02D 41/26* (2013.01); *B60W 30/1843* (2013.01); *B60W 2420/42* (2013.01); *B60W 2420/52* (2013.01); *B60W 2510/0657* (2013.01); *B60W 2510/0676* (2013.01); *B60W 2510/184* (2013.01); *B60W 2520/10* (2013.01); *B60W 2550/142* (2013.01); *B60W 2550/143* (2013.01); *B60W 2550/402* (2013.01); *B60W 2550/406* (2013.01); *B60W 2550/408* (2013.01); *B60W 2710/0666* (2013.01); *B60W 2710/0688* (2013.01); *B60W 2710/184* (2013.01); *B60W 2720/10* (2013.01); *F02D 2041/1412* (2013.01); *F02D 2200/501* (2013.01); *F02D 2200/602* (2013.01); *F02D 2200/701* (2013.01); *F02D 2200/702* (2013.01); *Y02T 10/76* (2013.01)

(56) References Cited

U.S. PATENT DOCUMENTS

| | | | |
|---|---|---|---|
| 2007/0275819 A1* | 11/2007 | Hirata | B60K 6/365 477/5 |
| 2011/0130908 A1* | 6/2011 | Mueller | B60W 10/26 701/22 |
| 2011/0136620 A1 | 6/2011 | Gibson et al. | |
| 2011/0174559 A1* | 7/2011 | Saito | B60K 6/48 180/65.27 |
| 2012/0046841 A1 | 2/2012 | Wurthner et al. | |
| 2012/0083984 A1* | 4/2012 | Johansson | B60W 10/06 701/70 |
| 2012/0220422 A1* | 8/2012 | Wurthner | B60W 10/02 477/79 |
| 2012/0220424 A1* | 8/2012 | Staudinger | B60W 30/16 477/80 |
| 2012/0265427 A1 | 10/2012 | Petridis et al. | |
| 2013/0096792 A1 | 4/2013 | Maier et al. | |
| 2013/0190998 A1 | 7/2013 | Polimeno et al. | |
| 2014/0031170 A1* | 1/2014 | Cunningham | F02D 23/00 477/53 |
| 2014/0088847 A1* | 3/2014 | Abdul-Rasool | B60W 10/02 701/67 |
| 2014/0114542 A1 | 4/2014 | Abdul-Rasool et al. | |
| 2015/0019117 A1* | 1/2015 | Huber | B60W 30/16 701/119 |
| 2015/0191170 A1* | 7/2015 | Johansson | B60K 31/00 701/94 |
| 2015/0224990 A1* | 8/2015 | Kim | B60W 50/0097 701/98 |
| 2015/0314775 A1* | 11/2015 | Dextreit | B60W 50/0097 701/22 |
| 2015/0321670 A1* | 11/2015 | Johansson | B60W 50/0097 701/94 |
| 2015/0362065 A1* | 12/2015 | Johansson | B60W 30/18072 701/65 |
| 2016/0101780 A1* | 4/2016 | Park | B60W 50/0097 701/70 |
| 2016/0214606 A1* | 7/2016 | Roos | B60W 50/0097 |
| 2017/0158204 A1* | 6/2017 | Roos | B60W 50/0097 |
| 2017/0166211 A1* | 6/2017 | Eom | B60W 10/06 |

FOREIGN PATENT DOCUMENTS

| | | |
|---|---|---|
| EP | 2679461 A1 | 1/2014 |
| EP | 2620339 A1 | 7/2014 |
| GB | 2508670 A | 6/2014 |
| JP | 2012121417 A | 6/2012 |
| WO | 2010069440 A1 | 6/2010 |
| WO | 2012169960 A1 | 12/2012 |
| WO | 20120169961 A1 | 12/2012 |
| WO | WO2012169961 A1 | 12/2012 |
| WO | 2014003654 A1 | 1/2014 |
| WO | 2014055016 A1 | 4/2014 |
| WO | 2014060825 A1 | 4/2014 |
| WO | 2014068719 A1 | 5/2014 |
| WO | 2014074050 A1 | 5/2014 |

OTHER PUBLICATIONS

Written Opinion of the International Searching Authority for PCT/SE2015/050701 dated Oct. 30, 2015.
Korean Office Action for Korean Patent Application No. 10-2017-7002623 dated Jun. 5, 2018.

* cited by examiner

CONTROL OF AN INTERNAL COMBUSTION ENGINE IN A VEHICLE

CROSS-REFERENCE TO RELATED APPLICATION(S)

This application is a national stage application (filed under 35 § U.S.C. 371) of PCT/SE15/050701, filed Jun. 16, 2015 of the same title, which, in turn claims priority to Swedish Application No. 1450872-5, filed Jul. 7, 2014 of the same title; the contents of each of which are hereby incorporated by reference.

FIELD OF THE INVENTION

The present invention relates to methods, systems, and computer program products for control of a combustion engine during a road section.

BACKGROUND OF THE INVENTION

For motor vehicles, such as cars, trucks and buses, the cost of fuel constitutes a significant expense for the vehicle's owner or user. For a hauling company, for example, the main expenditure items for the day-to-day operation of a vehicle consist, apart from the cost of acquisition of the vehicle and the vehicle's driver's salary, of costs of repair and maintenance and fuel for the propulsion of the vehicle. The fuel cost may impact the profitability of the hauling company to a great extent. Therefore, a number of different systems have been developed to reduce fuel consumption, such as efficient engines and fuel economical cruise controls.

Figure 1:
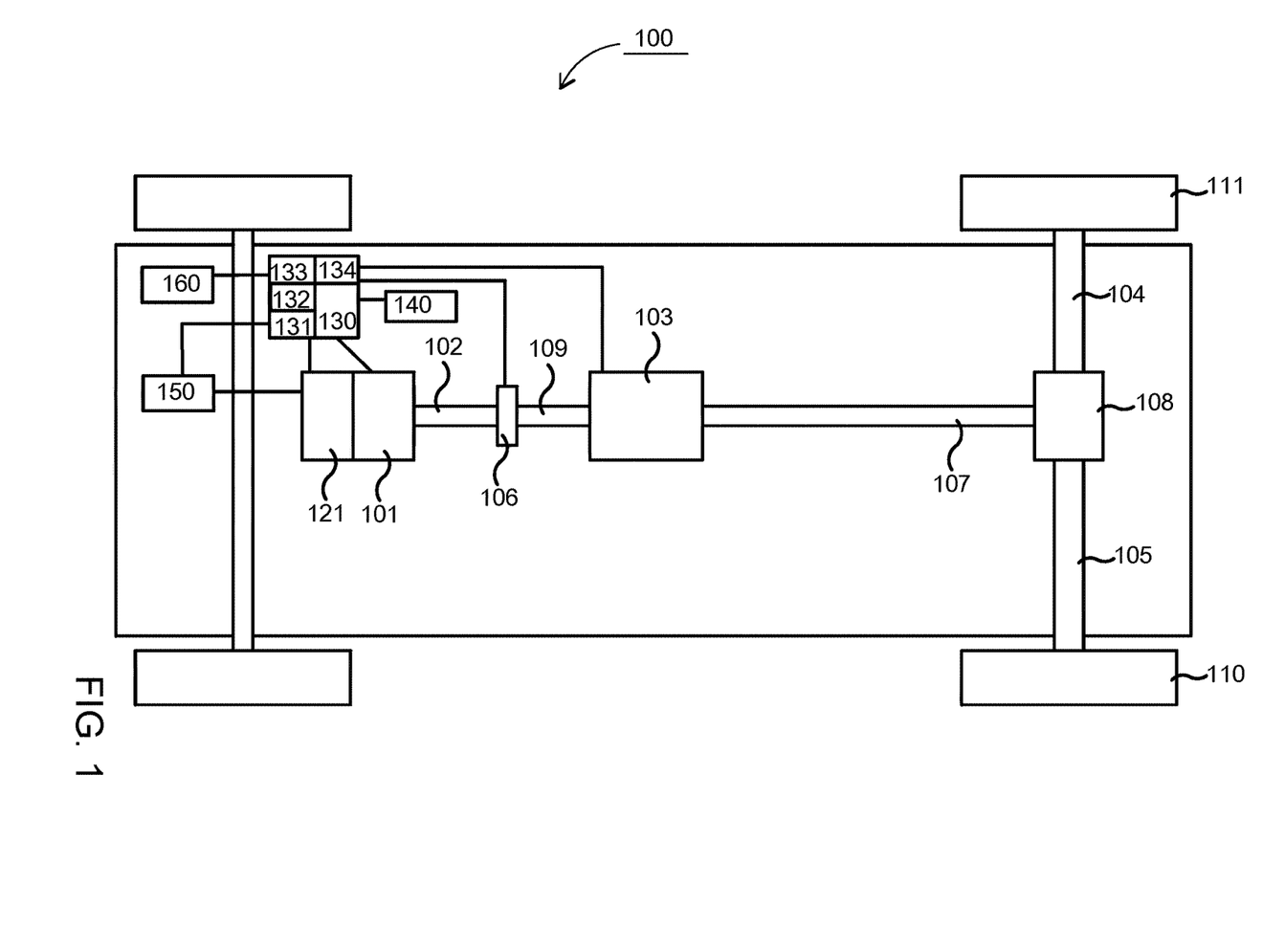
FIG. 1 shows a schematic view of an example vehicle,
FIG. 2 schematically shows a driving situation.

FIG. 1 schematically shows a powertrain in a vehicle 100. The powertrain comprises one or several engines, for example comprising a combustion engine 101 and/or an electric motor 121, which in a customary manner, via an output shaft 102 on the one or several engines 101, 121, usually via one or several flywheels, is connected to at least one input shaft 109 in a gearbox 103, via a clutch 106. The clutch 106 may e.g. consist of an automatically controlled clutch, and may be controlled by the vehicle's control system via a control device 130. The control device 130 may also control the gearbox 103.

The gearbox 103 is here illustrated schematically as one device. However, the gearbox 103 may also physically consist of several cooperating gearboxes, for example a so-called range gearbox, a main gearbox and a split gearbox, arranged along the vehicle's powertrain. The gearbox may comprise a suitable number of gears. Today's gearboxes for heavy goods vehicles usually have twelve forward gears, two reverse gears and one neutral gear. If the gearbox 103 consists, physically, of several part-gearboxes as described above, these twelve propulsive gears are distributed with two gears in the range gearbox, three gears in the main gearbox and two gears in the split gearbox, jointly constituting twelve gear positions (2*3*2=12). The vehicle 100 further comprises drive shafts 104, 105, which are connected to the vehicle's driving wheels 110, 111, and which are operated by an output shaft 107 from the gearbox 103, via a shaft gear 108, such as e.g. a customary differential.

The vehicle 100 further comprises various different braking systems, such as a customary braking system, which may comprise brake plates with associated brake pads (not shown), arranged next to each wheel. The vehicle 100 may also comprise one or several additional/auxiliary brakes, such as exhaust brakes, retarders or decompression brakes. The service brake system and the additional brake system are schematically illustrated as one unit 140 in FIG. 1. The engine 101 may be controlled based on instructions from a cruise control, in order to maintain a constant actual vehicle speed and/or to vary the actual vehicle speed, for example in such a manner that an optimized fuel consumption is obtained within reasonable speed limits. The engine 101 may also be controlled by a driver of the vehicle.

The vehicle may also comprise a system for monitoring the status and charging of one or several batteries (not displayed), which may be used, for example, at the start of the combustion engine 101 with the help of a starting engine, at operation of the engine, whereat the electric motor 121 is used to operate the vehicle, or for operation of one or several systems in the vehicle.

The vehicle may also comprise one or several systems using compressed air and/or hydraulic pressure, and therefore one or several compressors 150 may be comprised in the vehicle.

The vehicle may also comprise one or several devices 160 for temperature monitoring and/or temperature control. For example, the temperature of the one or several engines 101, 121, the temperatures for one catalyst in an exhaust purification device and/or the temperatures in a driver's cabin may be monitored and/or controlled, with the use of the one or several devices 160 for temperature monitoring and/or temperature control.

SUMMARY OF THE INVENTION

In the event of e.g. downhill slopes, or in situations where the vehicle must reduce its actual speed, fuel savings have historically been made through a reduced request of positive engine torque, or with the help of dragging. The reduced request of positive engine torque entails that the force driving in the direction of travel, emitted by the combustion engine via the driving wheels, is reduced, e.g. through reduced fuel injection into the engine, which reduces the fuel consumption.

Dragging means driving the vehicle with a closed powertrain, i.e. with the combustion engine connected to the vehicle's driving wheels, at the same time as the fuel injection to the combustion engine is closed. One advantage with this type of measure is, that since the fuel injection to the combustion engine is closed, the combustion engine's consumption is equal to zero. This measure does, however, also entail that the combustion engine 101 will be driven by the vehicle's driving wheels via the powertrain, and so-called "dragging" is thus achieved, whereat the combustion engine's internal losses give rise to a braking action, i.e. engine braking of the vehicle.

A reduction of the requested engine torque and dragging does indeed reduce fuel consumption, but this reduction is not always optimal, because the reduced engine torque nevertheless often consumes more fuel than necessary, and because the dragging also adds an engine braking, which is not fuel economical, of the vehicle.

Coasting has been presented in order to further reduce the fuel consumption. Coasting entails, as described in more detail below, that the vehicle's engine is disconnected from the vehicle's driving wheels. This may also be described as opening of the powertrain. Disconnection of the driving wheels from the engine may, for example, be achieved by putting the gearbox in a neutral gear, or by opening the clutch. At coasting, the engine is only supplied with fuel for idling of the engine.

By turning off one or several engines in the vehicle, additional fuel may be saved, since in this case no fuel at all needs to be supplied to the one or several shut down engines. In other words, the idling fuel may be saved for the engines, which are shut down during the coasting.

However, shutdown of engines may have a negative impact on the driveability of the vehicle, since it takes a relatively long time to extract a requested torque from the engine, if this is requested when the engine is shut down. In addition, for example, the oil pressure may drop during the engine shutdown, in such a manner that there is a risk of increased wear of bearings when the engine is again started. The turbo pressure also drops and/or disappears during the engine shutdown, which may have the result that the torque provided after the engine start is not consistent with the torque normally provided by the engine.

One objective of the present invention is to at least partly solve these problems, which may arise at engine shutdowns.

According to one aspect of the present invention, a method is provided for control of a combustion engine, during a road section when the vehicle is coasting with the combustion engine shut down. The combustion engine is here comprised in a vehicle comprising one or several engines.

According to the method, at least one future speed profile $v_{sim\_ICE\_off}$ is simulated for an actual speed $v_{act}$ of the vehicle during the road section ahead. The simulation is carried out when the road section is ahead of the vehicle, and each one of the at least one future speed profiles $v_{sim\_ICE\_off}$ is based on information about the road section, and on knowledge that coasting with the combustion engine shut down will, at least initially, be applied during the road section.

Subsequently, a starting point in time $t_{ICE\_start}$ is determined, when the combustion engine will need to be started because a driving force will be required for the vehicle again, and/or because one or several braking systems in the vehicle will need to be activated.

According to the invention, $T_{ICE\_start}$ is therefore not the point in time when the engine will really be started, but $T_{ICE\_start}$ is a point in time when a driving force from the engine will be required again, and/or one or several braking systems in the vehicle will need to be activated. According to prior art, the point in time when the engine will actually be started coincides with the point in time when a driving force from the engine will be needed, according to the invention, however, these are separate in time.

This determination of the starting point in time $t_{ICE\_start}$ is here based on the at least one future speed profile $v_{sim\_ICE\_off}$.

Subsequently, a starting point brought forward in time, $t_{ICE\_pre\_start}$, is determined, preceding the starting point in time $t_{ICE\_start}$ by an advancing period $T_{ICE\_pre\_start}$.

The combustion engine is then controlled to start at such determined starting point brought forward in time, $t_{ICE\_pre\_start}$.

Thus, the start of the combustion engine is brought forward compared to the starting point in time $t_{ICE\_start}$, when the engine would have been started, based on the vehicle's propulsion and/or braking requirements. Such bringing forward of the start of the combustion engine to the starting point brought forward in time, $t_{ICE\_pre\_start}$, means that the engine, and also other components in the vehicle, may be prepared before the engine is loaded. For example, the oil pressure and/or turbo pressure may be built up before the engine needs to be loaded, since the advancing period $T_{ICE\_pre\_start}$ may be used to prepare vehicle systems, for example by activating a compressor in the vehicle. Thus, the driveability is improved considerably compared to prior art solutions, since the engine according to the present invention is granted time to prepare before loading. When the present invention is used, the engine therefore responds as though the engine shutdown had never taken place, which is perceived as very positive by a driver of the vehicle. When the present invention is used, a coasting with the engine shut down may thus be completed by first starting the engine, following which a change to a forward driving gear in the gearbox is carried out, following which the engine is used to drive the vehicle forward.

The bringing forward of the start of the combustion engine to the starting point brought forward in time, $t_{ICE\_pre\_start}$, may also entail that the braking systems in the vehicle have sufficient time to be prepared before braking of the vehicle. For example, there is sufficient time to build up a pneumatic and/or hydraulic pressure used in the braking system before braking will need to be carried out, since the advancing period $T_{ICE\_pre\_start}$ may be used for this preparation, for example by activation of a compressor in the vehicle.

Bringing forward of the start of the combustion engine to the starting point brought forward in time, $t_{ICE\_pre\_start}$, may also entail that there is sufficient time to activate one or several cooling systems in the vehicle, in order to control the temperature, for example in the engine and/or in one or several braking systems in the vehicle, such as for example a retarder. Some braking systems, such as for example the retarder, require cooling in order to be able to provide an effective braking action. Cooling is provided, for example, by a cooling system operated by the engine.

The wear on the engine and on other components in the vehicle is reduced considerably with the use of the present invention, since, for example, there is sufficient time to build up the oil pressure before the engine is loaded. Thus, bearings and other components in the vehicle are spared wear, since they may be lubricated with oil when the engine is later loaded.

According to prior art solutions, the engine has instead been started at or after the propulsion requirement arises, which does not grant the engine and the vehicle's other components any time for preparation before the engine is loaded. This has resulted in poorer driveability and in component wear after the engine shutdown.

Thanks to the present invention, the engine may thus be shut down during coasting without the driver and/or the vehicle experiencing, any extra disruptions after such shutdown, and/or wear after the shutdown.

When the engine is shut down, additional fuel is saved compared to when, for example, coasting with an open powertrain is used, since no idling fuel is then consumed. In this document, a shutdown engine is defined as an engine which has zero engine speed; $\omega=0$. In a corresponding manner, an engine shutdown is defined as a measure that results in the engine speed after the measure becoming zero; $\omega=0$. In addition, coasting with a shutdown engine is considerably more advantageous for the exhaust treatment system than coasting while idling, since the exhaust treatment system retains the heat better with a shutdown engine, than when cooling air flows through the exhaust treatment system at idling. This more even temperature for the exhaust treatment system also contributes to a reduced fuel consumption, since so-called heating modes for the engine may then be avoided. At heating modes, fuel is used to actively heat a catalyst in the exhaust treatment system, which naturally contributes to the fuel consumption. When the engine is shut down, the exhaust treatment system retains heat better, so that the heating modes may thus be avoided.

The present invention may be implemented with little added complexity in the vehicle, since the invention may use data already available in other systems in the vehicle, such as information about the road section ahead, comprising for example road gradient, to which the cruise control in the vehicle already has access.

According to several embodiments of the present invention, one or several simulations of future speed profiles $v_{sim\_ICE\_off}$ for an actual speed of the vehicle may be carried out, which means that the system has very good control over how the vehicle will behave during the road section ahead of the vehicle. Based on these simulations, well founded decisions relating to engine starts, following engine shutdowns during coasting, may then be taken.

The present invention may be used both for pedal driving, i.e. when the driver regulates the torque demand from the engine, and for cruise control driving. The term pedal driving comprises, here and in this document, use of substantially all kinds of controls adapted to control torque request, such as, for example, an accelerator pedal or a hand gas device.

BRIEF DESCRIPTION OF THE DRAWINGS

The invention will be illustrated in more detail below, along with the enclosed drawings, where similar references are used for similar parts, and where.

DETAILED DESCRIPTION OF THE INVENTION

Figure 2:
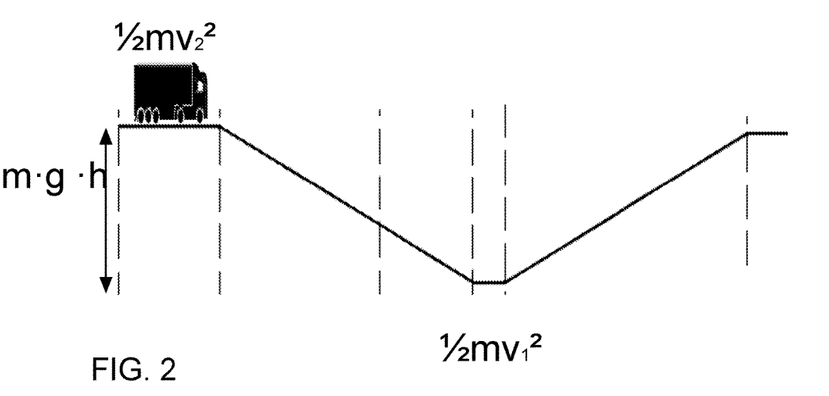

FIG. 2 shows schematically a non-limiting example of a driving situation, a downhill slope, where the present invention may be applied. The invention may also be applied in other driving situations, for example at a speed reduction, which may occur on a flat road. However, the driving situation in FIG. 2 will here, for pedagogical reasons, be used to describe principles used by the invention.

For the vehicle in FIG. 2, an energy relationship may be set up for the driving situation:

$$mgh = (\tfrac{1}{2}mv_2^2 - \tfrac{1}{2}mv_1^2) + (F_{air} + F_{rr} + F_{eng} + F_{gb} + F_{axle/nav}) \cdot s \quad \text{(equation 1)}$$

where:
mgh is the vehicle's potential energy;
$\tfrac{1}{2}mv_2^2$ is the vehicle's kinetic energy up on the top of the hill;
$\tfrac{1}{2}mv_1^2$ is the vehicle's kinetic energy at the end of the slope;
$F_{air}$ is the vehicle's air resistance;
$F_{rr}$ is the vehicle's rolling resistance;
$F_{eng}$ is the engine friction;
$F_{gb}$ is the gearbox friction;
$F_{axle/nav}$ is friction in the rear shaft, seals and wheel bearings; and
s is the distance between the top of the hill and the end of the slope.

Figure 3:
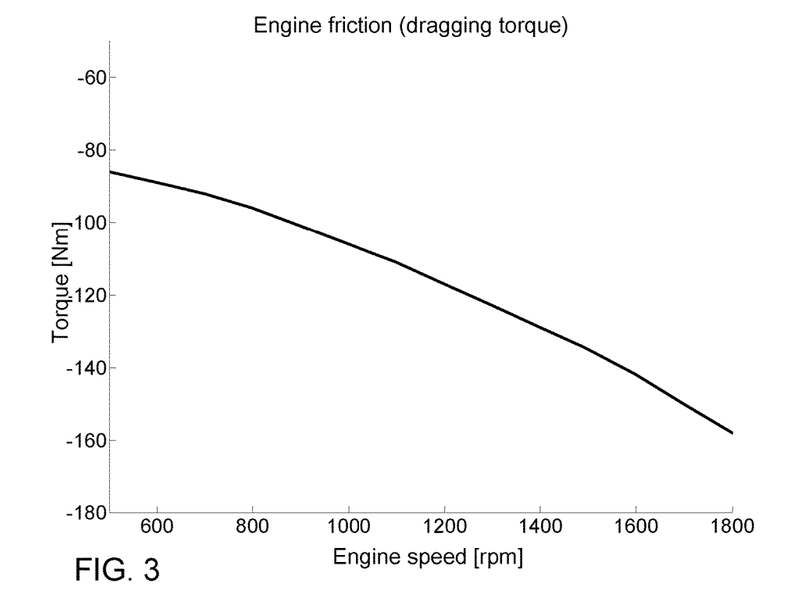
FIG. 3 shows a diagram of engine friction as a function of engine speed.

As illustrated by equation 1, a number of forces $F_{air}$, $F_{rr}$, $F_{eng}$, $F_{gb}$, and $F_{axle/nav}$ act against the vehicle's movements. FIG. 3 shows an example of engine friction for a truck engine. Here it is shown that the negative torque, corresponding to the engine friction $F_{eng}$, which counteracts the movement of the vehicle, increases with an increased engine speed in the engine 101 (note that the y-axis has a negative gradation in FIG. 3). In the reverse, a reduced engine speed in the engine results in a reduced force for the engine friction $F_{eng}$, that is to say a reduced negative torque.

In this document, coasting means that the vehicle's engine 101 is disconnected from the vehicle's driving wheels 110, 111, i.e. that the powertrain is opened. This disconnection of the driving wheels 110, 111 from the engine 101, also called opening of the powertrain, may e.g. be achieved by putting the gearbox 103 in a neutral gear or by opening the clutch 106. In other words, substantially no power is transmitted from the engine 101 to the driving wheels 110, 111 during coasting. Disconnection of one or several of the engines 101, 121 from the vehicle's 100 driving wheels 110, 111 when the vehicle 100 is moving is referred to in this document as coasting.

Coasting according to the present invention means that the forces acting against the vehicle's movement are significantly reduced, since the force of the engine friction $F_{eng}$ in this case decreases to a value substantially equal to zero (0). Therefore, coasting may significantly reduce fuel consumption through this reduction of the resistance against the vehicle.

This means, that from a fuel perspective it is often more advantageous to drive the vehicle with an open powertrain, i.e. by coasting, than with dragging, i.e. when the powertrain is closed while the fuel injection to the engine 101 is closed. The reason for this is that the limited amount of fuel required to keep the combustion engine in operation when the combustion engine is disconnected, is compensated for by the fact that the vehicle may continue with a disconnected combustion engine for a longer distance, e.g. after completing a downhill slope. This is due to, among others, the vehicle achieving a higher speed on e.g. the downhill slope when it is driven with a disconnected combustion engine, compared to when the vehicle is driven with a closed powertrain without fuel injection. At an engine shutdown used by the present invention no fuel at all is supplied to the engine.

In addition, when coasting, the force counteracting the vehicle being driven will be lower when the vehicle's combustion engine is disconnected from the driving shaft, since there is no engine braking force that counteracts the progress of the vehicle. This means that the vehicle will retard more slowly, e.g. when the vehicle reaches the end of a downhill slope, which in turn means that coasting may often be used over a relatively long distance, e.g. after the end of a downhill slope. Thus a significant reduction of fuel consumption is obtained.

The present invention is intended to further reduce fuel consumption at for example coasting, by way of turning off one or several of the engines in the vehicle if possible. When one or several engines are shut down, the fuel consumption decreases by the idling fuel, which would have been required to operate the one or several engines if they had not been shut down, that is to say if they had been kept running during the coasting.

Figure 4:
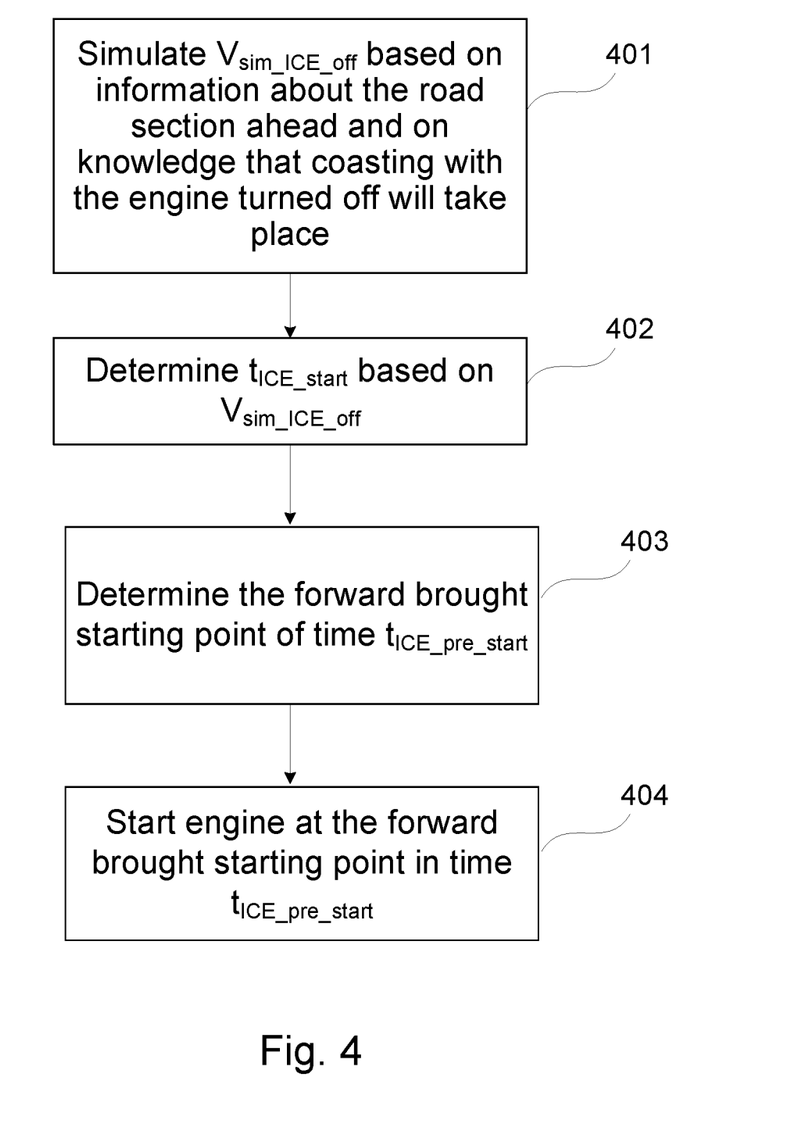
FIG. 4 shows a flow chart for the method according to the invention.

FIG. 4 shows a flow chart for the method according to the present invention. In a first step 401 of the method, for example with the use of the simulation unit 131 described below (FIG. 1), at least one future speed profile $v_{sim\_ICE\_off}$ is simulated for an actual speed $v_{act}$ of the vehicle 100 during the road section. The simulation is in this case carried out where the road section is in front of the vehicle 100. The simulation of each one of the at least one future speed profiles $v_{sim\_ICE\_off}$ is based on information about the road section and on knowledge that coasting with the combustion engine 101 shut down will, at least initially, be applied during the road section. The information about the road section may here, for example, comprise map data and/or road gradients, as described in further detail below.

In a second step 402 of the method, for example with the use of the first determination unit 132 described below (FIG. 1), a starting point in time $t_{ICE\_start}$ is determined, when the combustion engine 101 will need to be started, because a forward driving force is again required for the vehicle and/or because one or several braking systems 150 in the vehicle will need to be activated. Such determination of the starting point in time $t_{ICE\_start}$ is here based at least on the at least one future speed profile $v_{sim\_ICE\_off}$.

In a third step 403 of the method, for example with the use of the second determination unit 133 described below (FIG. 1), a starting point brought forward in time, $t_{ICE\_pre\_start}$, is determined, which precedes the starting point in time $t_{ICE\_start}$ by an advancing period $T_{ICE\_pre\_start}$. In other words, the starting point brought forward in time, $t_{ICE\_pre\_start}$, occurs before the starting point in time $t_{ICE\_start}$, which has been determined based on when the need for a forward driving or braking force arises. More specifically, the starting point brought forward in time, $t_{ICE\_pre\_start}$, occurs one advancing period $T_{ICE\_pre\_start}$ before the starting point in time $t_{ICE\_start}$ occurs. According to different embodiments of the present invention, this starting point brought forward in time, $t_{ICE\_pre\_start}$, may be determined based on a number of different parameters, described in detail below.

In a fourth step 404 of the method, the combustion engine is controlled to be started, for example with the use of the starting unit 134 described below (FIG. 1), at the starting point brought forward in time, $t_{ICE\_pre\_start}$.

This ensures that those of the vehicle's systems that need to be prepared for loading of the engine really are prepared when the engine is loaded. Thus, a safe and comfortable start of the engine, after engine shutdown during coasting, is provided.

As described in more detail below, potentially one or several systems in the vehicle need to be prepared for a future loading of the engine, after it has been started and/or for an activation of a braking system. For example, one or several compressors may need to be activated to ensure that a sufficient air pressure or hydraulic pressure is available in the vehicle, when the engine is shut down. Temperatures of for example the engines and/or one or several braking systems may also need to be controlled before the engine may be loaded and/or before the braking system is activated, in order to ensure that a safe and/or comfortable progress for the vehicle is provided, when the engine is loaded again.

The vehicle 100 displayed in FIG. 1 comprises, when the present invention is implemented in the vehicle, at least one control device 130, which may be arranged to control a number of different functions in the vehicle, such as among others the engines 101, 121, the clutch 106, the gearbox 103, the compressor 150, the brake system 140 and/or the temperature control devices 160.

As described in further detail below, the control device 130 in the system comprises, according to the present invention, a simulation unit 131, a first determination unit 132, a second determination unit 133, and a starting unit 134.

Thus, according to one aspect of the present invention, a system is provided, which is arranged for control of a combustion engine during a road section, when the vehicle is at least partly coasting with the combustion engine shut down.

The system comprises a simulation unit 131, which is arranged to simulate at least one future speed profile $v_{sim\_ICE\_off}$ for an actual velocity $v_{act}$ of the vehicle 100 during the road section ahead. The simulation is thus carried out where the road section is in front of the vehicle 100. The simulations of each one of the at least one future speed profiles $v_{sim\_ICE\_off}$ are based on information about the road section and on the knowledge/awareness that coasting with the combustion engine 101 shut down, at least initially, will be applied during the road section.

The system also comprises a first determination unit 132, which is arranged for determination of a starting point in time $t_{ICE\_start}$, when the combustion engine 101 will need to be started because a forward driving force is again required for the vehicle and/or because one or several brake systems 140 in the vehicle will need to be activated. The determination of the starting point in time $t_{ICE\_start}$ is here based on the at least one future speed profile $v_{sim\_ICE\_off}$.

The system also comprises a second determination unit 133, arranged for the determination of a starting point brought forward in time, $t_{ICE\_pre\_start}$. The starting point brought forward in time, $t_{ICE\_pre\_start}$, precedes the starting point in time $t_{ICE\_start}$ by an advancing period $T_{ICE\_pre\_start}$.

The system also comprises a starting unit 134, which is arranged to control a start of a combustion engine 101 at the starting point brought forward in time, $t_{ICE\_pre\_start}$.

The system may also be arranged to perform each of the embodiments of the present invention described in this document, so that the system for the respective embodiments obtains the advantages for the respective embodiments described herein.

Here, and in this document, devices are often described as being arranged to carry out steps in the method according to the invention. This also comprises that the devices are adapted and/or set up to carry out these method steps.

As a person skilled in the art will realize, the control device 130 may also be arranged to control or communicate with one or several additional systems in the vehicle.

The at least one control device 130 is drawn in the figure as comprising separately marked units 131, 132, 133, 134. These units 131, 132, 133, 134 may also be logically separate, but physically implemented in the same unit, or may be both logically and physically jointly arranged/implemented. For example, these units 131, 132, 133, 134 may correspond to different groups of instructions, for example in the form of program code, which is fed into, and used by a processor, when the respective unit carries out the respective corresponding method step.

The simulation of the at least one future speed profile $v_{sim\_ICE\_off}$ for the actual vehicle speed $v_{act}$ during the road section ahead, is thus carried out when the road section is ahead of the vehicle, and based on the information about the road section ahead. Thus, one or several future speed profiles $v_{sim\_ICE\_off}$ are simulated for the vehicle's actual speed, wherein the simulation is carried out in such a manner that it is based on the vehicle's current position and situation, and looks ahead over the road section, whereat the simulation is carried out, among others, based on the above described information about the road section.

For example, the simulation may be carried out in the vehicle with a predetermined frequency, such as for example with the frequency 1 Hz, which means that a new simulation result is ready every second. The road section for which the simulation is carried out comprises a predetermined distance ahead of the vehicle, which may for example be 1 km long. The road section may also be seen as a horizon, for which the simulation is carried out, in front of the vehicle.

The simulation may be based on one or several of a number of parameters, such as information about the road section, a used transmission mode in the vehicle, one or several of a driving style, a current actual vehicle speed, a vehicle weight, an air resistance, a rolling resistance, a gearing ratio in the gearbox and/or the powertrain, a wheel radius, and/or at least one engine property, such as a maximum and/or a minimum engine torque.

The information/knowledge about the road section may comprise, among others, the road gradient $\alpha$ and/or a curvature for the road section. The road gradient $\alpha$ and/or the curvature may be obtained in a number of different ways. The road gradient $\alpha$ and/or the curvature may be determined based on map data, e.g. from digital maps comprising topographical information, in combination with positioning information, such as GPS information (Global Positioning System). With the help of positioning information, the vehicle's position in relation to the map data may be determined, so that the road gradient $\alpha$ and/or the curvature may be extracted from the map data.

In several cruise control systems today, map data and positioning information is used in the cruise control. Such systems may thus provide map data and positioning information to the system according to the present invention, which means that the added complexity for the determination of the road gradient $\alpha$ and/or the curvature is minimized.

The road gradient $\alpha$, on which the simulations are based, may also be obtained by way of estimating the road gradient experienced by the vehicle at the time of simulation. There are many ways of estimating this road gradient $\alpha$, e.g. based on an engine torque in the vehicle, on an acceleration of the vehicle, on an accelerometer, on GPS information, on radar information, on camera information, on information from another vehicle, on positioning-related and road gradient information stored previously in the vehicle, and/or on information obtained from traffic systems related to said road section. In systems where information exchange between vehicles is used, the road gradient estimated by a vehicle may also be provided to other vehicles, either directly or via an intermediate unit, such as a database or similar.

The knowledge/information may also be obtained based on radar information, on camera information, on information from another vehicle, on positioning information stored previously in the vehicle and, for example, road gradient and/or curvature information, or on information obtained from traffic systems related to the road section. In a system where information exchange between vehicles is used, information determined by one vehicle may also be provided to other vehicles, either directly or via an intermediate unit, such as a database or similar.

Obstacles in a future road section, for example in the form of junctions, traffic jams, accidents or similar, may also be identified and used as information about the road section, whereat future deceleration may be estimated.

The shutdown of one/several of the one or several engines 101, 121 occurs while the vehicle is coasting, that is to say when there is an opening of a clutch 106 in the vehicle, and/or when a neutral gear is used in the gearbox 103 in the vehicle. For vehicles with more than one engine, one or several of these engines may be coasting. As an example, a hybrid powertrain may be configured in such a way that the combustion engine may be disconnected with the clutch 106, while the electric motor is arranged between the clutch 106 and the gearbox 103. Accordingly, in this configuration, the use of a neutral gear in the gearbox means that both the combustion engine and the electric motor are coasting, while an activation of the clutch means that only the combustion engine is coasting. In this document, an engine shutdown is defined as a case where an engine has zero engine speed; $\omega=0$.

According to one embodiment of the present invention, bringing the engine start forward in time depends on a level for a load, to which the engine will be subjected after the start. In other words, the determination of the starting point brought forward in time, $t_{ICE\_pre\_start}$, is based on a magnitude for a forward driving force $F_{drive}$ acting on the vehicle, which force will be required after the combustion engine 101 has been started. This may, for example, ensure that the required pressures, e.g. in the engine oil and/or the turbo, are available when the engine will be loaded, since there will be sufficient time for activation of the compressor 150. In other words, the start is brought forward more if the engine will be loaded harder, and the engine start is brought forward less if the engine will be loaded less after the start. The wear on the engine and potential other components in the vehicle is thus reduced. Additionally, an increased driveability is provided, since the driver perceives the vehicle as though it behaves normally after the engine start.

For example, the combustion engine 101 may be dragged after the start, that is to say that the engine is turned around by the kinetic energy of the vehicle, which may also be referred to as engine braking. This dragging, and the corresponding required forward driving force $F_{drive}$ may be determined based on one or several simulations $v_{sim\_drag}$, which assume that the engine drags in conjunction with a connected powertrain. The simulations are otherwise carried out based on parameters corresponding to the other simulations described in this document, that is to say among others based on information about the road section ahead.

Generally, systems and/or components in the vehicle, which are normally operated by the engine, may also be operated with the use of dragging. Dragging of an engine may here, for example, be used to operate a cooling system, or components in the cooling system, such as a coolant pump. At dragging, the load on the engine is moderate, since no fuel is injected into the engine. There is, however, a moderate mechanical load on the engine, since its parts/components are loaded to some extent when the engine is dragged around by the vehicle's kinetic energy. Thus, the magnitude of the forward driving force $F_{drive}$ corresponding to dragging of the one or several engines 101, 121 is small and often negative. As a non-limiting example, the forward driving force $F_{drive}$ corresponding to dragging may be −1000 Nm. The forward driving force $F_{drive}$ depends, however, on e.g. the engine type, rear shaft gearing, speed and the gear used. The advancing period $T_{ICE\_pre\_start}$ may be determined as a relatively small value for the dragging, since there is sufficient time anyway to prepare the one or several engines 101, 121 for the moderate mechanical load on the engine, which dragging requires. The starting point brought forward in time, $t_{ICE\_pre\_start}$, here thus is placed relatively closely before the starting point in time $t_{ICE\_start}$, for example 2 seconds before the starting point in time $t_{ICE\_start}$.

The forward driving force $F_{drive}$, which will be required after the combustion engine 101 has been started, may also correspond to an active forward driving of the vehicle 100, for example at a large load on an uphill slope after the engine start, where a relatively high load of the engine will exist after the start. This relatively high load may correspond to a torque obtained from the engine, which is relatively high compared with the engine's maximum torque. For example, this maximum torque may correspond to 2000 NM (engine torque)*1 (gearing on the direct gear)*2.71 (gearing on the final gear)/0.5 (wheel radius)=10840 N (force on the driving wheels) for the direct gear, and other corresponding values for other gears in the gearbox. The advancing period $T_{ICE\_pre\_start}$ is then determined as a relatively large value, so that there is sufficient time for said vehicle 100 to be prepared for this active forward driving before the starting point in time $t_{ICE\_start}$, for example 5 seconds before the starting point in time $t_{ICE\_start}$.

The above specified relatively moderate, small and large values for the load/forward driving force have equivalents in a torque obtained from the engine, and wherein the relative size for the values may be related to the engine's maximum torque.

According to one embodiment of the present invention, cruise control logic is used to control the vehicle's speed. The forward driving force $F_{drive}$, which will be required after the combustion engine 101 has been started, may then be determined based on a simulation of at least one future cruise control speed profile $v_{sim\_CC}$ for an actual vehicle speed $v_{act}$, during at least a part of the road section. The simulation of the cruise control speed profile $v_{sim\_CC}$ is carried out when at least a part of the road section is ahead of the vehicle 100. The simulation of each one of the at least one future cruise control speed profiles $v_{sim\_CC}$ is based on the above said information about the road section, and on a selected, set velocity $v_{set}$ for the road section for a cruise control in the vehicle 100.

According to one embodiment of the present invention, the determination of the starting point brought forward in time, $t_{ICE\_pre\_start}$, that is to say the advancing period $T_{ICE\_pre\_start}$, is based on a temperature $T_e$ for one or more engines 101, 121 in the vehicle and/or on a temperature $T_b$ for one or several braking systems 140 in the vehicle.

There is a defined engine temperature interval $[T_{e\_min}, T_{e\_max}]$ for each one of the vehicle's engines 101, 121. The respective engine should remain within its engine temperature interval $[T_{e\_min}, T_{e\_max}]$, in order to provide efficient operation and minor wear.

In a similar manner, there is a defined braking temperature interval $[T_{b\_min}, T_{b\_max}]$ for each one of the vehicle's braking systems 140. The respective braking system should remain within its braking temperature interval $[T_{b\_min}, T_{b\_max}]$, in order to provide efficient braking.

The vehicle 100 may comprise at least one device for temperature control 160, which may, for example, comprise a cooling system for the engines 101, 121 and/or for the braking systems, such as a retarder. The control of the temperature may here comprise an activation of the at least one device for temperature control 160, if the engine temperature $T_e$ is outside of the desired engine temperature interval $[T_{e\_min}, T_{e\_max}]$.

According to one embodiment, the advancing period $T_{ICE\_pre\_start}$ is determined in such a manner that there is sufficient time for the engine temperature $T_e$ to be adjusted to a value within the desired engine temperature interval $[T_{e\_min}, T_{e\_max}]$; $T_{e\_min} < T_e < T_{e\_max}$; before the starting point in time $t_{ICE\_start}$. If the engine temperature $T_e$ has a value, which is further from the desired engine temperature interval $[T_{e\_min}, T_{e\_max}]$ the advancing period $T_{ICE\_pre\_start}$ is thus given a greater value, than where the engine temperature $T_e$ has a value near the desired engine temperature interval $[T_{e\_min}, T_{e\_max}]$.

This ensures a good working temperature for the engine when it is loaded after the start.

The control of the temperature may here also comprise an activation of the at least one device for temperature control 160, if a temperature for a braking system $T_b$, for example a retarder, is outside the desirable braking temperature interval $[T_{b\_min}, T_{b\_max}]$.

According to one embodiment, the advancing period $T_{ICE\_pre\_start}$ is determined in such a manner that there is sufficient time for the braking temperature $T_b$ to be adjusted to a value within the desired braking temperature interval $[T_{b\_min}, T_{b\_max}]$; $T_{b\_min} < T_b < T_{b\_max}$; before the starting point in time $t_{ICE\_start}$. If the braking temperature $T_b$ has a value which is further away from the desired braking temperature interval $[T_{b\_min}, T_{b\_max}]$ the advancing period $T_{ICE\_pre\_start}$ is here given a greater value than where the braking temperature $T_b$ has a value near the desired braking temperature interval $[T_{b\_min}, T_{b\_max}]$. This ensures a good working temperature for the braking system when it is activated after the start of the engine.

Since there must be sufficient time to adjust temperatures by way of bringing forward the starting point in time, in some cases relatively long advancing periods $T_{ICE\_pre\_start}$, for example 30 seconds, may be used, since it is often time consuming to adjust the temperature.

According to one embodiment of the present invention, the determination of the starting point brought forward in time, $t_{ICE\_pre\_start}$, is based on how the start of the combustion engine 101 will be carried out. In this document, both the use of the starting engine and/or the dragging with the help of the clutch 106 is comprised in the concept engine start, since the engine may be started by dragging of the vehicle 100.

When the engine is started with the use of dragging, the use of dragging to start the engine may also be included as a basis for the simulations for the at least one future speed profile $v_{sim\_ICE\_off}$, and/or for the determination of the starting point in time $t_{ICE\_start}$, when the combustion engine will need to be started because of a power or braking requirement, since dragging of the engine consumes a part of the vehicle's kinetic energy through the engine braking it entails.

According to one embodiment of the present invention, the determination of the starting point brought forward in time, $t_{ICE\_pre\_start}$, is based on one or several vehicle specific parameters. These vehicle specific parameters may comprise hardware related parameters, which depend on the components fitted in the vehicle.

Such a parameter may consist of a time $T_{oil}$, required to build up an oil pressure $P_{oil}$ in the combustion engine 101. By having regard to the time required to build up the oil pressure, unnecessary wear of bearings in the engine and other vehicle components due to lack of lubricating oil may be avoided.

Another such parameter may consist of a time $T_{turbo}$, required to build up a turbo pressure $P_{turbo}$ in a turbo charger in the vehicle. This ensures that the driveability of the vehicle is maintained at a suitable level even after the engine shutdown, which also means that the driver perceives that the vehicle behaves as it normally does.

According to one embodiment of the present invention, the determination of the starting point brought forward in time, $t_{ICE\_pre\_start}$, is based on a predetermined constant value for the advancing period $T_{ICE\_pre\_start}$. In other words, here a constant and predetermined advancing period $T_{ICE\_pre\_start}$ may be used to bring forward the engine start, so that the same time for preparation of the load of the engine will be provided for different driving modes.

However, the driving modes that a vehicle may experience may be divided into different types of driving mode, for example the driving modes "uphill slope", "downhill slope" or other typical driving modes. Different predetermined constant values for the advancing period $T_{ICE\_pre\_start}$ may then be used for the different respective types of driving mode.

For example, such a predetermined constant value for the advancing period $T_{ICE\_pre\_start}$ may be equal to 3 seconds; $T_{ICE\_pre\_start}$=3 seconds. Another example of such a predetermined constant value for the advancing period $T_{ICE\_pre\_start}$ may consist of 5 seconds; $T_{\_pre\_start}$=5 seconds; for the driving mode where there is an uphill slope after the start of the combustion engine 101.

According to the present invention, the vehicle is coasting in connection with the engine shutdown. A determination of whether coasting is applicable or not may, for example, be based on the one or several simulated future speed profiles $v_{sim}$, and one or several of a minimum permitted speed $v_{min}$, below which the vehicle should not fall, and a maximum permitted speed $v_{max}$, which an actual speed of the vehicle 100 should not exceed. By comparing the simulated future speed profiles $v_{sim}$ with these maximum and/or minimum permitted speeds, a controlled coasting may be achieved.

At coasting, a very fuel efficient driving of the vehicle may be achieved with the use of an open clutch or neutral gear, if this is suitable for road sections ahead of the vehicle.

The minimum permitted speed $v_{min}$, that is to say the level of the minimum permitted speed $v_{min}$, is, according to one embodiment, related to a current actual speed $v_{act}$ of the vehicle. The maximum permitted speed $v_{max}$ is, according to one embodiment, related to a constant speed braking speed $v_{dhsc}$ for the vehicle.

The minimum permitted speed $v_{min}$ and/or the maximum permitted speed $v_{max}$ may be altered dynamically, and may have different values for different transmission modes.

The minimum permitted speed $v_{min}$ may, according to one embodiment, be determined at least partly based on information related to a cruise control system in the vehicle, for example based on a set speed $v_{set}$, that is to say a driver selected speed, for a cruise control system, or based on a reference speed $v_{ref}$, which is used by the cruise control system to control a speed governor. The determination of the minimum permitted speed $v_{min}$ may also be carried out by the cruise control system, and be provided to the system according to the present invention.

According to one embodiment of the present invention, the system according to the present invention is integrated, at least partly, with cruise control logic in a cruise control system in the vehicle. The minimum permitted speed $v_{min}$ may then be controlled by the vehicle's cruise control logic. For example, an intelligent cruise control reduces the vehicle speed before downhill slopes, since the vehicle will accelerate anyway during the downhill slope. According to this embodiment, the cruise control may also initiate a reduction of the minimum permitted speed $v_{min}$, and thus extend the period of coasting and/or of the highest possible gear for the vehicle. This reduction of the minimum permitted speed $v_{min}$ may, for example, be achieved if the minimum permitted speed $v_{min}$ is related to the reference speed $v_{ref}$, which is the setpoint value that is reduced by the cruise control before the downhill slope, so that the control of the minimum permitted speed $v_{min}$ is achieved automatically.

For example, the minimum permitted speed $v_{min}$ may constitute a percentage of the reference speed $v_{ref}$.

Generally, the speed threshold values used by the present invention, that is to say the minimum permitted speed $v_{min}$ and the maximum permitted speed $v_{max}$, may be determined in numerous different ways. For example, the driver may set these threshold values, they may constitute a percentage of an actual speed $v_{act}$ of the vehicle, they may constitute a percentage of a set speed $v_{set}$ for the cruise control system in the vehicle and/or they may be based on historic driving of the vehicle. Historic driving may be considered, for example, via the use of an adaptive algorithm, which is updated during the vehicle's progress.

As a non-limiting example, the following values could be used for the speed threshold values in this document:

$v_{min}$=82 km/h or $v_{min}$=0.98*$v_{set}$ km/h; and
$v_{max}$=90 km/h or $v_{max}$=1.06*$v_{set}$ km/h, or $v_{max}$=0.995*$v_{dhsc}$ km/h As described above, the road gradient may be determined based on map data and positioning information. If such data is not available, the simulations may be based on estimates of the road gradient experienced by the vehicle at the time of simulation. This places greater requirements on the minimum permitted speed $v_{min}$ and/or the maximum permitted speed $v_{max}$, since the simulations becomes less accurate and more varying in size. In addition the length of the horizon, that is to say the road section, according to one embodiment of the invention, may be shortened to prevent such variations.

Where the road gradient for the road section is approximated with the road gradient experienced by the vehicle at the simulation itself, the best result will be obtained at a slight downhill slope. Slight downhill slopes are ideal for coasting if, for example, the road gradient is such that the simulated speed $v_{sim}$ is within its permitted interval, between the minimum permitted speed $v_{min}$ and the maximum permitted speed $v_{max}$.

One advantage with simulating future speed profiles based on the current gradient, is that the same algorithm may be used for both roads and vehicles when there is no access to the future road gradient, as well as for roads and vehicles when there is access to the future road gradient. In addition, the simulation uses speed dependent terms, such as e.g. air resistance and engine torque, so that a good estimate of how the vehicle will behave in the future is obtained, even without any knowledge about the future road gradient.

Figure 5:
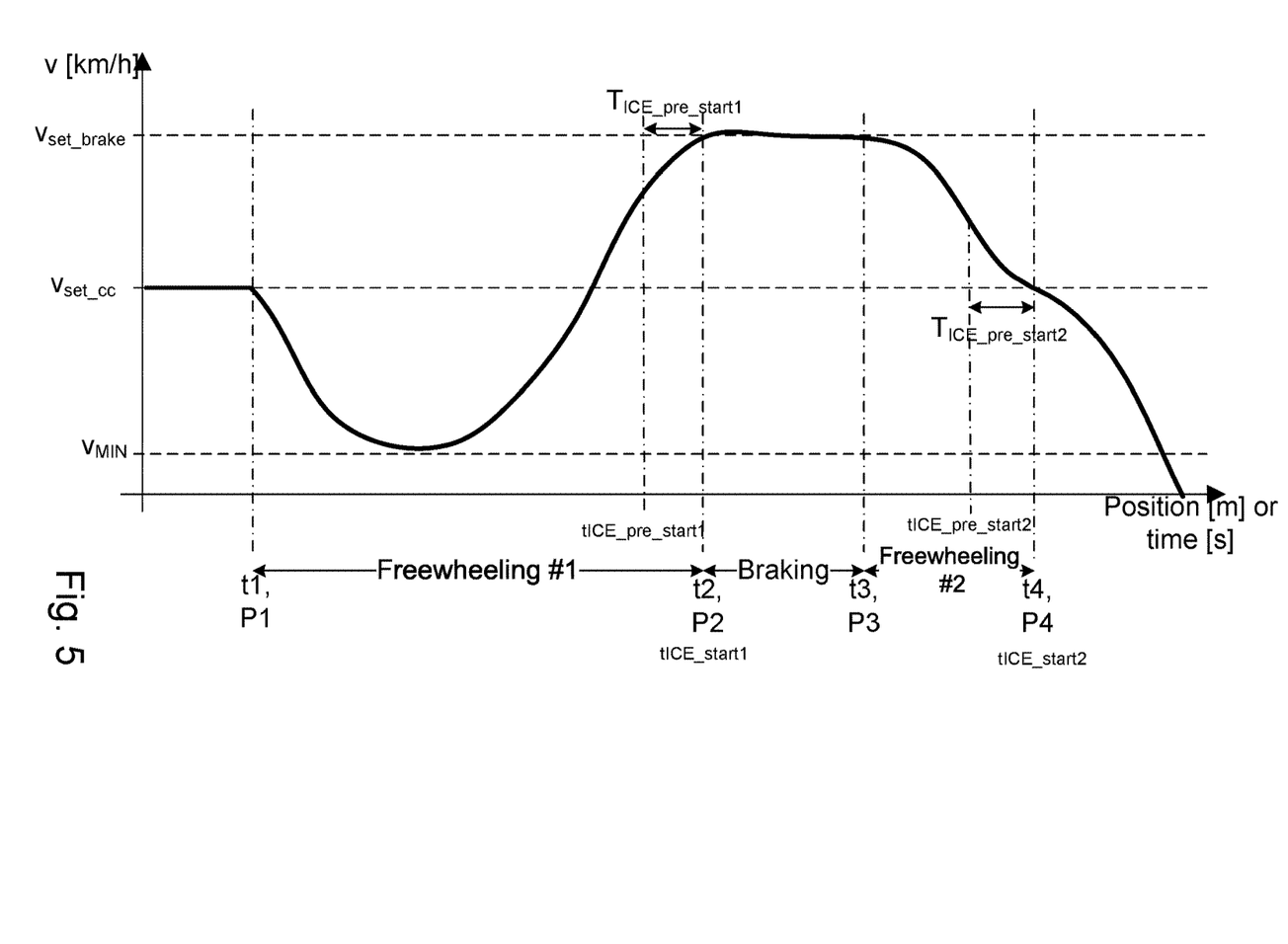
FIG. 5 shows an example of a simulation according to the invention.

FIG. 5 schematically shows a driving mode comprising, for example, a downhill slope, where the present invention may be used. Here, the method starts at a first point in time t1, corresponding to a first position P1. The at least one future speed profile $v_{sim\_ICE\_off}$ here thus simulates a first coasting, during which the engine may be shut down between the first point in time/position t1/P1 and a second point in time/position t2/P2.

If the engine has been shut down, according to one embodiment of the present invention, the engine should be started early, if one or several of the following conditions are not met before the engine will need to be loaded:

an air pressure $P_{air\_brake}$ in one or several brake systems exceeds a pressure threshold value $P_{air\_brake\_th}$; $P_{air\_brake}$>$P_{air\_brake\_th}$;

an air pressure $P_{air\_act}$, which is used to actuate one or several devices in the vehicle, such as a gearbox, a clutch, an actuator at the engine e.g. for EGR and/or exhaust braking, or a level control system for the suspension, exceeds a pressure threshold value $P_{air\_act\_th}$; $P_{air\_act}$>$P_{air\_act\_th}$;

a charging status L for one or several batteries in the vehicle exceeds a charging value $L_{th}$; $L > L_{th}$;

an engine temperature $T_e$ is within an engine temperature interval $[T_{e\_min}, T_{e\_max}]$; $T_{e\_min} < T_e < T_{e\_max}$;

a catalyst temperature $T_c$ is within a catalyst temperature interval $[T_{c\_min}, T_{c\_max}]$; $T_{c\_min} < T_c < T_{c\_max}$;

a cabin temperature $T_h$ is within a cabin temperature interval $[T_{h\_min}, T_{h\_max}]$; $T_{h\_min} < T_h < T_{h\_max}$; and a powertrain status D indicates that a powertrain in the vehicle has an acceptable function.

The second point in time/position t2/P2 in FIG. 5 here corresponds to a starting point $t_{ICE\_start1}$, when the engine will need to be activated again, after the shutdown, as one or several braking systems 140 in the vehicle will need to be activated in order to counteract the vehicle's speed rising substantially above the maximum permitted speed, which here corresponds to a constant speed brake $V_{set\_brake}$. The second point in time/position t2/P2 may, according to one embodiment, be determined based on the at least one future speed profile $v_{sim\_ICE\_off}$.

According to different embodiments of the present invention, a first starting point brought forward in time, $t_{ICE\_pre\_start\_1}$, may then be determined, where such a first starting point brought forward in time $t_{ICE\_pre\_start\_1}$ precedes the starting point in time $t_{ICE\_start1}$ t2/P2 by a first advancing period $T_{ICE\_pre\_start\_1}$. Thus, according to different embodiments of the present invention, the engine will be started one first advancing period $T_{ICE\_pre\_start\_1}$ earlier than the starting point in time $t_{ICE\_start1}$ t2/P2, which means that the braking system will be prepared for braking, since among others the compressor 150 has been able to be activated during the first advancing period $T_{ICE\_pre\_start\_1}$.

Between the second point in time/position t2/P2 and the third point in time/position t3/P3, the vehicle is decelerated during the downhill slope.

After the third point in time/position t3/P3, the vehicle will be able to coast with the engine shut down again.

According to various embodiments of the present invention, a second starting point brought forward in time, $t_{ICE\_pre\_start\_2}$, may be determined, where such a second starting point brought forward in time, $t_{ICE\_pre\_start\_2}$, precedes a fourth point in time/position $t_{ICE\_start2}$ t4/P4, when the vehicle speed becomes lower than a set speed $v_{set}$ for the cruise control by a second advancing period $T_{ICE\_pre\_start\_2}$. Thus, according to various embodiments of the present invention, the engine will be started a second advancing period $T_{ICE\_pre\_start\_2}$ earlier than the fourth point in time $t_{ICE\_start2}$ t4/P4, as the dropping vehicle speed means that the engine must be active anyway, because there is a need for a forward driving force in the vehicle again, since the set speed $v_{set}$ is undershot. Here, the engine will thus be running during the second advancing period $T_{ICE\_pre\_start\_2}$, which means that the vehicle may be prepared for the engine's future load, for example by building up the oil and/or turbo pressure, as described above.

Prior art solutions would have started the engine at the second point in time/position t2/P2 and at the fourth point in time/position t4/P4, respectively, so that the vehicle would not be prepared for braking and/or loading of the engine.

A person skilled in the art will realize that a method for control of preparatory measures during a road section for at least one system according to the present invention, may also be implemented in a computer program, which when executed in a computer will cause the computer to carry out the method. The computer program usually consists of a computer program product 603 stored on a digital storage medium, where the computer program is comprised in the computer program products' computer readable medium. Said computer readable medium consists of a suitable memory, e.g. ROM (Read-Only Memory), PROM (Programmable Read-Only Memory), EPROM (Erasable PROM), Flash, EEPROM (Electrically Erasable PROM), a hard disk device, etc.

Figure 6:
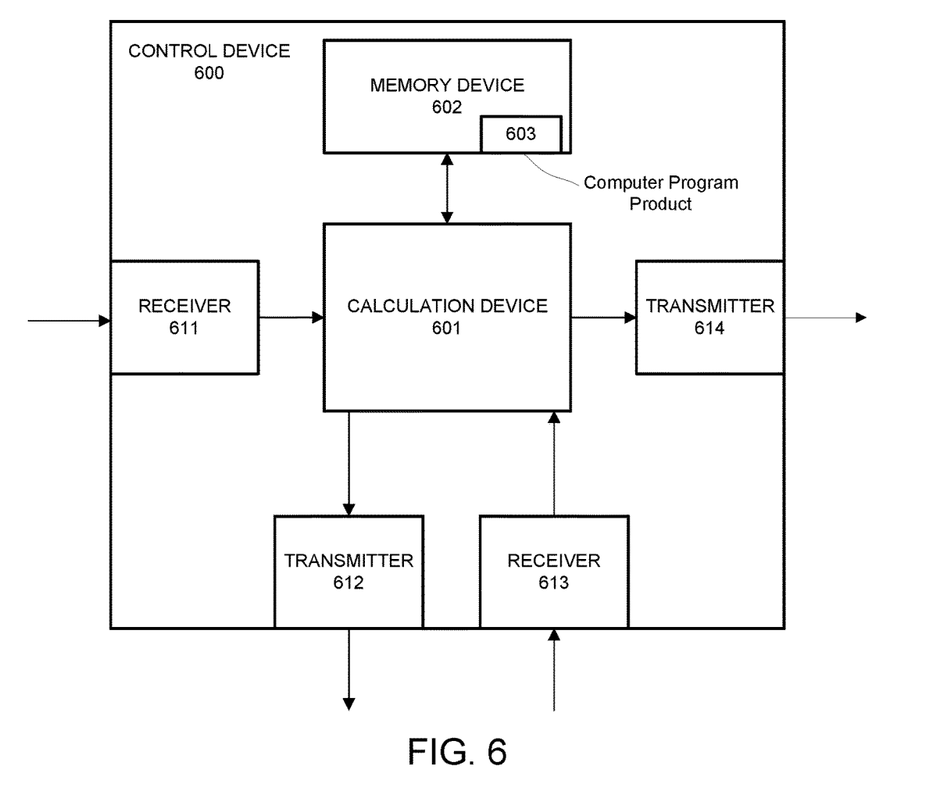
FIG. 6 shows a control device, in which the present invention may be implemented.

FIG. 6 schematically shows a control device 600. The control device 600 comprises a calculation device 601, which may consist of substantially any suitable type of processor or microcomputer, e.g. a circuit for digital signal processing (Digital Signal Processor, DSP), or a circuit with a predetermined specific function (Application Specific Integrated Circuit, ASIC). The calculation device 601 is connected to a memory unit 602 installed in the control device 600, providing the calculation device 601 with e.g. the stored program code and/or the stored data, which the calculation device 601 needs in order to be able to carry out calculations. The calculation unit 601 is also set up to store interim or final results of calculations in the memory unit 602.

Further, the control device 600 is equipped with devices 611, 612, 613, 614 for receipt and sending of input and output signals, respectively. These input and output signals may contain wave shapes, pulses, or other attributes, which may be detected as information by the devices 611, 613 for the receipt of input signals, and may be converted into signals that may be processed by the calculation device 601. These signals are then provided to the calculation device 601. The devices 612, 614 for sending of output signals are arranged to transform signals received from the calculation device 601 for the creation of output signals by e.g. modulating the signals, which may be transmitted to other parts of and/or systems in the vehicle.

Each one of the connections to the devices for receiving and sending of input and output signals may consist of one or several of a cable; a data bus, such as a CAN (Controller Area Network) bus, a MOST (Media Oriented Systems Transport) bus, or any other bus configuration; or of a wireless connection. A person skilled in the art will realize that the above-mentioned computer may consist of the calculation device 601, and that the above-mentioned memory may consist of the memory unit 602.

Generally, control systems in modern vehicles consist of a communications bus system, consisting of one or several communications buses to connect a number of electronic control devices (ECUs), or controllers, and different components localized on the vehicle. Such a control system may comprise a large number of control devices, and the responsibility for a specific function may be distributed among more than one control device. Vehicles of the type shown, thus often comprise significantly more control devices than what is shown in FIG. 6, which is well known to a person skilled in the art within the technology area.

The present invention, in the embodiment displayed, is implemented in the control device 600. The invention may also be implemented wholly or partly in one or several other control devices already existing in the vehicle or in a control device dedicated to the present invention.

A person skilled in the art will obviously realize that speeds and speed threshold values, which are specified in this document, have equivalents and may be translated into engine speed and engine speed thresholds or torque and torque threshold values. Likewise, a person skilled in the art will realize that there is a very well-known correlation between distances, times and speeds, so that the times and time periods specified herein have equivalents in positions and distances.

A person skilled in the art will also realize that the above system may be modified according to the different embodiments of the method according to the invention. In addition the invention relates to a motor vehicle 100, for example a truck or a bus, comprising at least one system for control of a combustion engine during a road section according to the invention.

The present invention is not limited to the embodiments of the invention described above, but relates to and comprises all embodiments within the protected scope of the enclosed independent claims.

The invention claimed is:

1. A method for control of a combustion engine during a road section, in a vehicle comprising one or several engines, wherein said vehicle is coasting with said combustion engine shut down, wherein said method comprises:
   simulation of at least one future speed profile $v_{sim\_ICE\_off}$ for an actual speed $v_{act}$ of said vehicle during said road section, wherein said simulation is carried out when said road section is ahead of said vehicle, and wherein said simulation of each one of said at least one future speed profile $v_{sim\_ICE\_off}$ is based on information about said road section and on knowledge that said coasting with the combustion engine shut down will, at least initially, be applied during said road section;
   determination of a starting point in time $t_{ICE\_start}$, when a forward driving force from said combustion engine in said vehicle will be required again, and/or because one or several braking systems in said vehicle will need to be activated, wherein said determination of said starting point in time $t_{ICE\_start}$ is based on said at least one starting point brought forward in time, $t_{ICE\_pre\_start}$;
   determination of a starting point brought forward in time, $t_{ICE\_pre\_start}$, which precedes said starting point in time $t_{ICE\_start}$ by an advancing period $T_{ICE\_pre\_start}$; and
   starting said combustion engine at said starting point brought forward in time $t_{ICE\_pre\_start}$.

2. A method according to claim 1, wherein said determination of said starting point brought forward in time, $t_{ICE\_pre\_start}$, is based on a magnitude for a forward driving force $F_{drive}$ for said vehicle, which will be required after said combustion engine has been started.

3. A method according to claim 2, wherein said magnitude of said forward driving force $F_{drive}$ corresponds to dragging of said one or several engines, wherein said advancing period $T_{ICE\_pre\_start}$ is determined in such a manner that there is sufficient time to prepare said one or several engines for said dragging before said starting point in time $t_{ICE\_start}$.

4. A method according to claim 2, wherein said magnitude of said forward driving force $F_{drive}$ corresponds to an active forward driving of said vehicle, wherein said advancing period $T_{ICE\_pre\_start}$ is determined in such a manner that there is sufficient time to prepare said vehicle for said active forward driving before said starting point in time $t_{ICE\_start}$.

5. A method according to claim 2, wherein said forward driving force $F_{drive}$, which will be required after said combustion engine has been started, is determined based on a simulation of at least one future cruise control speed profile $v_{sim\_CC}$ for an actual speed $v_{act}$ of said vehicle, during at least a part of said road section, wherein said simulation is carried out when said at least one part of said road section is ahead of said vehicle, and wherein said simulation of each one of said at least one future cruise control speed profile $v_{sim\_CC}$ is based on information about said road section and on a selected set speed $v_{set}$ for a cruise control in said vehicle during said road section.

6. A method according to claim 1, wherein said determination of said starting point brought forward in time, $t_{ICE\_pre\_start}$, is based on a temperature $T_e$ for one or several engines in said vehicle.

7. A method according to claim 6, wherein said advancing period $T_{ICE\_pre\_start}$ is determined in such a manner that there is sufficient time for said engine temperature $T_e$ to be adjusted to a value within an engine temperature interval $[T_{e\_min}, T_{e\_max}]$; $T_{e\_min} < T_e < T_{e\_max}$; before said starting point in time $t_{ICE\_start}$.

8. A method according to claim 1, wherein said determination of said starting point brought forward in time, $t_{ICE\_pre\_start}$, is based on a temperature $T_b$ for one or several braking systems in said vehicle.

9. A method according to claim 8, wherein said advancing period $T_{ICE\_pre\_start}$ is determined in such a manner that there is sufficient time for said braking temperature $T_b$ to be adjusted to a value within a braking temperature interval $[T_{b\_min}, T_{b\_max}]$ ; $T_{b\_min} < T_b < T_{b\_max}$, before said starting point in time $t_{ICE\_start}$.

10. A method according to claim 1, wherein said determination of said starting point brought forward in time, $t_{ICE\_pre\_start}$, is based on how said start of said combustion engine will be carried out.

11. A method according to claim 10, wherein said combustion engine may be started by one from among the group:
   a starting engine: and
   dragging of said vehicle.

12. A method according to claim 1, wherein said determination of said starting point brought forward in time, $t_{ICE\_pre\_start}$, is based on at least one vehicle specific parameter.

13. A method according to claim 12, wherein said one vehicle specific parameter comprises at least one from the group of:
   a time $T_{oil}$, which is required to build up an oil pressure $P_{oil}$ in said combustion engine; and
   a time $T_{turbo}$, which is required to build up a turbo pressure $P_{turbo}$ in a turbocharger in said vehicle.

14. A method according to claim 1, wherein said determination of said starting point brought forward in time, $t_{ICE\_pre\_start}$, is based on a predetermined constant value for said advancing period $T_{ICE\_pre\_start}$.

15. A method according to claim 1, wherein said advancing period $T_{ICE\_pre\_start}$ has a value in the group of:
   $T_{ICE\_pre\_start} \leq 5$ seconds;
   $T_{ICE\_pre\_start} = 3$ seconds; and
   $T_{ICE\_pre\_start} = 5$ seconds, if there is an uphill slope after said start of said combustion engine.

16. A method according to claim 1, wherein said information about said road section is obtained from map data in combination with positioning information.

17. A method according to claim 1, wherein said information about said road section is provided by a cruise control system, which uses map data and positioning information at cruise control.

18. A method according to claim 1, wherein said information about said road section is determined based on some information in the group of:
   radar-based information;
   camera-based information;
   information obtained from another vehicle than said vehicle;
   positioning information stored previously in the vehicle; and
   information obtained from traffic systems relating to said road section.

19. A computer program product comprising computer program code stored on a non-transitory computer-readable medium readable by a computer, said computer program product used for control of a combustion engine during a road section, in a vehicle comprising one or several engines, wherein said vehicle is coasting with said combustion engine shut down, said computer program code comprising computer instructions to cause one or more computer processors to perform the operations of:

- simulation of at least one future speed profile $V_{sim\_ICE\_off}$ for an actual speed $v_{act}$ of said vehicle during said road section, wherein said simulation is carried out when said road section is ahead of said vehicle, and wherein said simulation of each one of said at least one future speed profile $V_{sim\_ICE\_off}$ is based on information about said road section and on knowledge that said coasting with the combustion engine shut down will, at least initially, be applied during said road section;
- determination of a starting point in time $t_{ICE\_start}$, when a forward driving force from said combustion engine in said vehicle will be required again, and/or because one or several braking systems in said vehicle will need to be activated, wherein said determination of said starting point in time $t_{ICE\_start}$ is based on said at least one starting point brought forward in time, $t_{ICE\_pre\_start}$;
- determination of a starting point brought forward in time, $t_{ICE\_pre\_start}$, which precedes said starting point in time $t_{ICE\_start}$ by an advancing period $T_{ICE\_pre\_start}$; and
- starting said combustion engine at said starting point brought forward in time $t_{ICE\_pre\_start}$.

20. A system arranged for control of a combustion engine during a road section, in a vehicle comprising one or several engines, whereat said vehicle is coasting with said combustion engine shut down, wherein said system comprises:

- a simulation unit, arranged for simulation of at least one future speed profile $V_{sim\_ICE\_off}$ for an actual speed $v_{act}$ of said vehicle during said road section, whereat said simulation is carried out when said road section is ahead of said vehicle, and wherein said simulation of each one of said at least one future speed profile $V_{sim\_ICE\_off}$ is based on information about said road section, and on knowledge that said coasting with the combustion engine shut down will, at least initially, be applied during said road section;
- a first determination unit, arranged for determination of a starting point in time $t_{ICE\_start}$, when a forward driving force on said vehicle will be required again from said combustion engine and/or because one or several braking systems in said vehicle will need to be activated, wherein said determination of said starting point in time $t_{ICE\_start}$ is based on said at least one starting point brought forward in time $t_{ICE\_pre\_start}$;
- a second determination unit, arranged for determination of a starting point brought forward in time, $t_{ICE\_pre\_start}$, which precedes said starting point in time $t_{ICE\_start}$ by an advancing period $T_{ICE\_pre\_start}$; and
- a starting unit, arranged for start of said combustion engine at said starting point brought forward in time, $t_{ICE\_pre\_start}$.

* * * * *